United States Patent [19]

Naito et al.

[11] Patent Number: 5,133,063
[45] Date of Patent: Jul. 21, 1992

[54] METHOD AND SYSTEM FOR OUTPUTTING PROGRAM CHANGE EFFECT INFORMATION TO A USER

[75] Inventors: Ichiro Naito, Shibuya; Hiroyuki Maezawa, Tama, both of Japan

[73] Assignee: Hitachi, Ltd., Tokyo, Japan

[21] Appl. No.: 223,612

[22] Filed: Jul. 25, 1988

[30] Foreign Application Priority Data

Jul. 29, 1987 [JP] Japan ............................ 62-187658

[51] Int. Cl.$^5$ ............................................ G06F 15/40
[52] U.S. Cl. .................... 395/500; 364/DIG. 1; 364/274.3; 364/191; 395/50
[58] Field of Search ... 364/200 MS File, 900 MS File, 364/300, 191, 192, 488, 489; 395/500, 1, 10, 50, 51

[56] References Cited

U.S. PATENT DOCUMENTS

| 4,635,189 | 1/1987 | Kendall | 364/200 |
| 4,670,834 | 6/1987 | Byal et al. | 364/186 |
| 4,805,113 | 2/1989 | Ishii et al. | 364/491 |
| 4,827,428 | 5/1989 | Dunlop et al. | 364/491 |
| 4,862,349 | 8/1989 | Foreman et al. | 364/200 |

OTHER PUBLICATIONS

R. C. Waters "The Programmer's Apprentice: Knowledge Based Program Editing", IEEE Tran. on Software Engineering, vol. SE-8, No. 1, Jan. 1983 pp. 1-12.
R. C. Waters "The Programmer's Apprentice: A Session with KBEmacs", IEEE Tran. on Software Engineering, vol. SE-11, No. 11, Nov. 1985, pp. 1296-1320.

Primary Examiner—Thomas C. Lee
Attorney, Agent, or Firm—Antonelli, Terry, Stout & Kraus

[57] ABSTRACT

A program change effect indicating method for use in a computer system designed to support the determination of parts to be changed in a program. Change steps associated with the method include; the steps of generating analyzed program information by analyzing a program, the analyzed program information representing attributes of respective statements in the program which constitute the program as well as connections between the statements; generating, in accordance with predetermined program intention determining rules, program intention information representing the intentions of the respective statements in the program from the analyzed program information. Inputting change designating information designated by a user which represents a statement to be changed and the contents of the changes; Further change steps associated with the method includes generating, in accordance with predetermined change detail determining rules, change effect information which identifies statements to be changed in association with the change designated by the user and the contents of the required changes from the program intention information, the information representing the relationship between the statements, and the change designating information; and outputting the change effect information.

8 Claims, 23 Drawing Sheets

FIG. 2

```
0100    DECLARE  A(200) BYTE ;
0110    DECLARE  I      BYTE ;
0120    DECLARE  IMAX BYTE DATA (200) ;

0200    I = 1 ;
0210    DO WHILE I > IMAX ;
0220    A(I)  = 0 ;
0230    I     = I + 1 ;
0240    END ;
```

FIG. 4

PROCEDURE STATEMENT INTENTION UNDERSTANDING RULE

⋮

· RULE 10

IF AN ARRAY ELEMENT IS MOVED OR COMPARED IN A STATEMENT, THE STATEMENT IS AN ARRAY ELEMENT ACCESS STATEMENT.

· RULE 11

IF AN ARRAY INDEX STORE DATA IS MOVED OR COMPARED IN A STATEMENT, THE STATEMENT IS AN ARRAY INDEX VARIABLE ACCESS STATEMENT.

⋮

DATA DECLARATION STATEMENT UNDERSTANDING RULE

⋮

· RULE 20

IF A SCALAR VARIABLE IS USED AN ARRAY INDEX TO ACCESS AN ARRAY ELEMENT IN AN ARRAY ELEMENT ACCESS STATEMENT, THE SCALAR VARIABLE IS AN ARRAY INDEX STORE VARIABLE.

· RULE 21

IF A SCALAR VARIABLE IS MOVED OR COMPARED IN AN ARRAY INDEX, THE SCALAR VARIABLE IS AN ARRAY INDEX STORE VARIABLE.

· RULE 22

IF AN ARRAY INDEX STORE VARIABLE HAS THE INITIAL VALUE EQUAL TO THE NUMBER OF AN ARRAY ELEMENTS, THE VARIABLE IS AN ARRAY MAXIMUM INDEX VALUE STORE VARIABLE.

✕✕✕ LIST OF STATEMENTS AFFECTED BY CHANGE ✕✕✕

| STATEMENT NO | STATEMENT AFFECTED BY CHANGE | CHANGE CONTENTS |
|---|---|---|
| 0110 | DECLARE I BYTE | · THE TYPE MUST CHANGE FROM BYTE TO WORD |
| 0120 | DECLARE I MAX BYTE DATA (200) | · THE INITIAL VALUE MUST CHANGE FROM 200 TO 300<br>· THE TYPE MUST CHANGE FROM BYTE TO WORD |
| | | |

FIG. 11

```
0100    DECLARE   A(200)   BYTE;
0110    DECLARE   I        BYTE;
0120    DECLARE   IMAX BYTE DATA (199);

0200    I = 1;
0210    DO WHILE I > IMAX;
0220    A(I) = 0;
0230    I    = I+1;
0240    END;
```

FIG. 13

INFERENCE RULE FOR THE CHANGE EFFECT OF THE NUMBER OF ARRAY STATEMENT

⋮

· RULE 10

IF AN ARRAY ELEMENT IS MOVED OR COMPARED IN A STATEMENT, THE STATEMENT IS AN ARRAY ELEMENT ACCESS STATEMENT. CERTAINTY 100%

· RULE 11

IF AN ARRAY INDEX STORE DATA IS MOVED OR COMPARED IN A STATEMENT, THE STATEMENT IS AN ARRAY INDEX VARIABLE ACCESS STATEMENT. CERTAINTY 100%

⋮

DATA DECLARATION STATEMENT INTENTS INFERENCE RULE

⋮

· RULE 20

IF A SCALAR VARIABLE IS USED AN ARRAY INDEX TO ACCESS AN ARRAY ELEMENT IN AN ARRAY ELEMENT ACCESS STATEMENT, THE SCALAR VARIABLE IS AN ARRAY INDEX STORE VARIABLE. CERTAINTY 100%

· RULE 21

IF A SCALAR VARIABLE IS MOVED OR COMPARED IN AN ARRAY INDEX, THE SCALAR VARIABLE IS AN ARRAY INDEX STORE VARIABLE. CERTAINTY 90%

· RULE 22

IF AN ARRAY INDEX STORE VARIABLE HAS THE INITIAL VALUE EQUAL TO THE NUMBER OF AN ARRAY ELEMENTS, THE VARIABLE IS AN ARRAY MAXIMUM INDEX VALUE STORE VARIABLE. CERTAINTY 90%

· RULE 23

IF AN ARRAY INDEX VARIABLE HAS INITIAL VALUE THAT DIFFERS FROM THE NUMBER OF AN ARRAY INDEX STORE VARIABLE, THE VARIABLE IS AN ARRAY INDEX STORE VARIABLE. CERTAINTY 80%

FIG. 16

| | *** LIST OF STATEMENTS AFFECTED BY CHANGE *** | | |
|---|---|---|---|
| STATEMENT NO | STATEMENT AFFECTED BY CHANGE | CHANGE CONTENTS | CERTAINTY |
| 0110 | DECLARE I BYTE | . THE TYPE MUST CHANGE FROM BYTE TO WORD | 100% |
| 0120 | DECLARE I MAX | . THE INITIAL VALUE MUST CHANGE FROM 199 TO 299 | 80% |
| | BYTE DATA (199) | . THE TYPE MUST CHANGE FROM BYTE TO WORD | 80% |
| ⋮ | ⋮ | ⋮ | ⋮ |

FIG. 18

| STATEMENT NO | STATEMENT AFFECTED BY CHANGE | CHANGE CONTENTS | CERTAINTY |
|---|---|---|---|
| | ✗✗✗ LIST OF STATEMENTS AFFECTED BY CHANGE ✗✗✗ | | |
| 0110 | DECLARE I BYTE | . THE TYPE MUST CHANGE FROM BYTE TO WORD | 100% |
| 0120 | DECLARE I MAX | . THE INITIAL VALUE MUST CHANGE FROM 199 TO 299 | 100% |
| | BYTE DATA (199) | . THE TYPE MUST CHANGE FROM BYTE TO WORD | 100% |
| ⋮ | ⋮ | ⋮ | ⋮ |

FIG. 20

INFERENCE RULE FOR THE CHANGE EFFECT
OF THE NUMBER OF ARRAY ELEMENTS

RULE 40
    IF THE NUMBER OF AN ARRAY ELEMENTS IS CHANGED, THE INITIAL VALUE OF AN ARRAY MAXIMUM INDEX VALUE STORE MUST BE CHANGED BY THE DIFFERENCE BETWEEN THE NEW NUMBER OF THE ARRAY ELEMENTS AND THE OLD ONE. CERTAINTY 80%

RULE 41
    IF THE NUMBER OF ARRAY ELEMENTS IS CHANGED ABOVE 256 FROM A NUMBER BELOW 255 AND THE TYPE OF THE ARRAY INDEX STORE VARIABLE IS BYTE THE TYPE OF THE ARRAY INDEX STORE VARIABLE MUST BE CHANGED TO WORD. CERTAINTY 90%

FIG. 21

| STATEMENT NO | STATEMENT AFFECTED BY CHANGE | CHANGE CONTENTS | CERTAINTY |
|---|---|---|---|
| 0110 | DECLARE I BYTE | . THE TYPE MUST CHANGE FROM BYTE TO WORD | 90% |
| 0120 | DECLARE I MAX | . THE INITIAL VALUE MUST CHANGE FROM 199 TO 299 | 64% |
| | BYTE DATA (199) | . THE TYPE MUST CHANGE FROM BYTE TO WORD | 72% |
| ⋮ | ⋮ | ⋮ | ⋮ |

✗✗✗ LIST OF STATEMENTS AFFECTED BY CHANGE ✗✗✗

METHOD AND SYSTEM FOR OUTPUTTING PROGRAM CHANGE EFFECT INFORMATION TO A USER

BACKGROUND OF THE INVENTION

1. Field of the Invention

The present invention relates to a method of indicating the necessity of supplementary change of a program when the program has been partially changed in a computer system designed to support program changes.

2. Description of the Prior Art

Each of the statements (declaration statements and procedure statements) in a program is closely related to one or more other statements, and a change in one statement may therefore lead, to a certain change in several other statements that are related to the first statement. However, in general it is not easy to specify all of the parts of a program that should be derivatively changed nor to specify the contents of such a change. Conventionally, a computer system designed to support such a task is known in which the syntax of a program, i.e., the procedure statements in the program and the relationship between the data which is used by the program are analyzed and the result of analysis is output as a document. A user who checks this document is capable of searching for the data or statements that need to be changed in connection with any change effected in a certain statement or data. As a way of providing an improved version of this document, a system for tracing and displaying interactively related statements or data in response to designation of a statement or data by the user without outputting the analysis result as a document is also known.

However, these known systems can only determine the intention of the respective statements or data in a program within a range defined by the relevant program language itself, and fail to capture the intention of the programmer which is given in that programming. In consequence, the user can detect the data and/or statements that are related to the designated data or statement but cannot be alerted to the fact that a change is necessary nor can he be informed what kind of change is necessary in cases where change is required. It is therefore difficult for the user to change all the parts that need to be changed without error even when such support systems are used.

SUMMARY OF THE INVENTION

Accordingly, a first object of the present invention is to provide a method and a system for indicating a program change effect which is capable of indicating not only the parts in a program that are related to a part to be changed but also those parts that need to be changed derivatively as well as the contents of the necessary changes.

However, there is a limit to the certainty with which the parts that need to be derivatively changed and the contents of the requisite changes can be determined by the system.

A second object of the present invention is therefore to improve such a method of and system for indicating a program change effect in which consideration is given to such limits in the certainty of determining these factors.

To achieve the first object, the present invention provides a method and a system for indicating a program change effect in which change effect information representing statements which need to be changed accompanying a change in a statement designated by a user, as well as the contents of the requisite changes, is generated from program intention information representing the intention of respective statements in a program, information representing the relationship between certain statements, statements to be changed and the contents of the necessary changes that are designated by the user, the generation being effected in accordance with predetermined change effect detecting rules.

The second object of the present invention is attained by the provision a method of and a system for indicating program change effect in which a degree of certainty determined by the certainty factor affixed to program intention information is added to change effect information when the change effect information is generated.

BRIEF DESCRIPTION OF THE DRAWINGS

FIG. 2 shows an example of an object program to be changed;

FIG. 4 shows an example of program intention understanding rules;

FIG. 7 shows an example of the display of embodiment of FIG. 1;

FIG. 11 shows an example of an object program to be changed;

FIG. 13 shows an example of program intention inference rules affixed with information representing a certainty;

FIG. 16 shows an example of the display of change detail information obtained by the embodiment shown in FIG. 10;

FIG. 18 shows an example of the display of change detail information obtained by the embodiment of FIG. 17;

FIG. 20 shows an example of program change detail inference rules affixed with a certainty factor;

FIG. 21 shows an example of the display of change detail information obtained by the embodiment of FIG. 19;

DETAILED DESCRIPTION OF THE PREFERRED EMBODIMENTS

The present invention will hereinafter be described in detail by way of example with reference to the accompanying drawings.

A first embodiment of the present invention will be described with reference to FIG. 1.

A program change effect detecting system includes a source program storage part 1 for storing a source program to be changed. FIG. 2 shows an example of the source program stored in the storage part 1.

Figure 3:
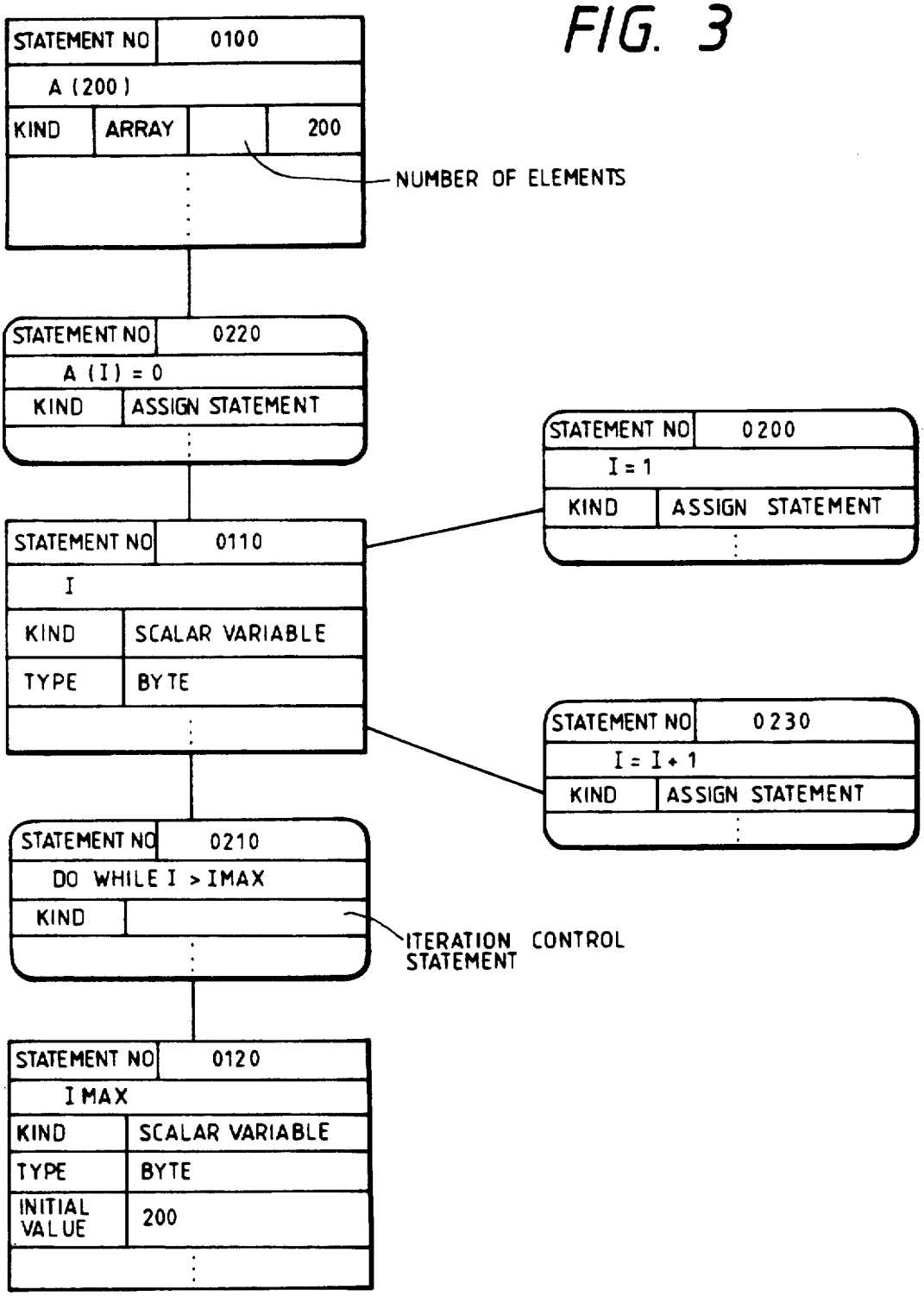
FIG. 3 shows an example of an analyzed program information of the program shown in FIG. 2.

The program change effect detecting system also includes a program analysis part (functional module) 2 for analyzing the syntax of or the sequences of data in the source program stored in the store part 1 using a known technique, and an analyzed program information store part 3 for storing the analyzed program information obtained by the program analysis part 2. FIG. 3 illustrates an example of the analyzed program information obtained by analyzing the source program shown in FIG. 2 which is stored in the store part 3. As can be seen from FIG. 3, the analyzed program information is composed of information representing attributes of the respective statements which constitute the program, and information which represents the relationship between the statements (which is represented by the lines connecting the blocks in the figure).

A card inputting unit 4 is adapted to input from a card program intention understanding rules used to understand the intentions of the respective statements which constitute the program. FIG. 4 shows an example of the program intention understanding rules input from the card. The program intention understanding rules are a set of rules which determine the intentions of the respective statements in the program from the attributes thereof and the relationships between the statements. A program intention understanding rules information input part (functional module) 5 has the function of analyzing the program intention understanding rules which are input by the card inputting unit 4 and inputting the program intention understanding rules information obtained by the analysis in a program intention understanding rules information storage part 6.

Figure 5:
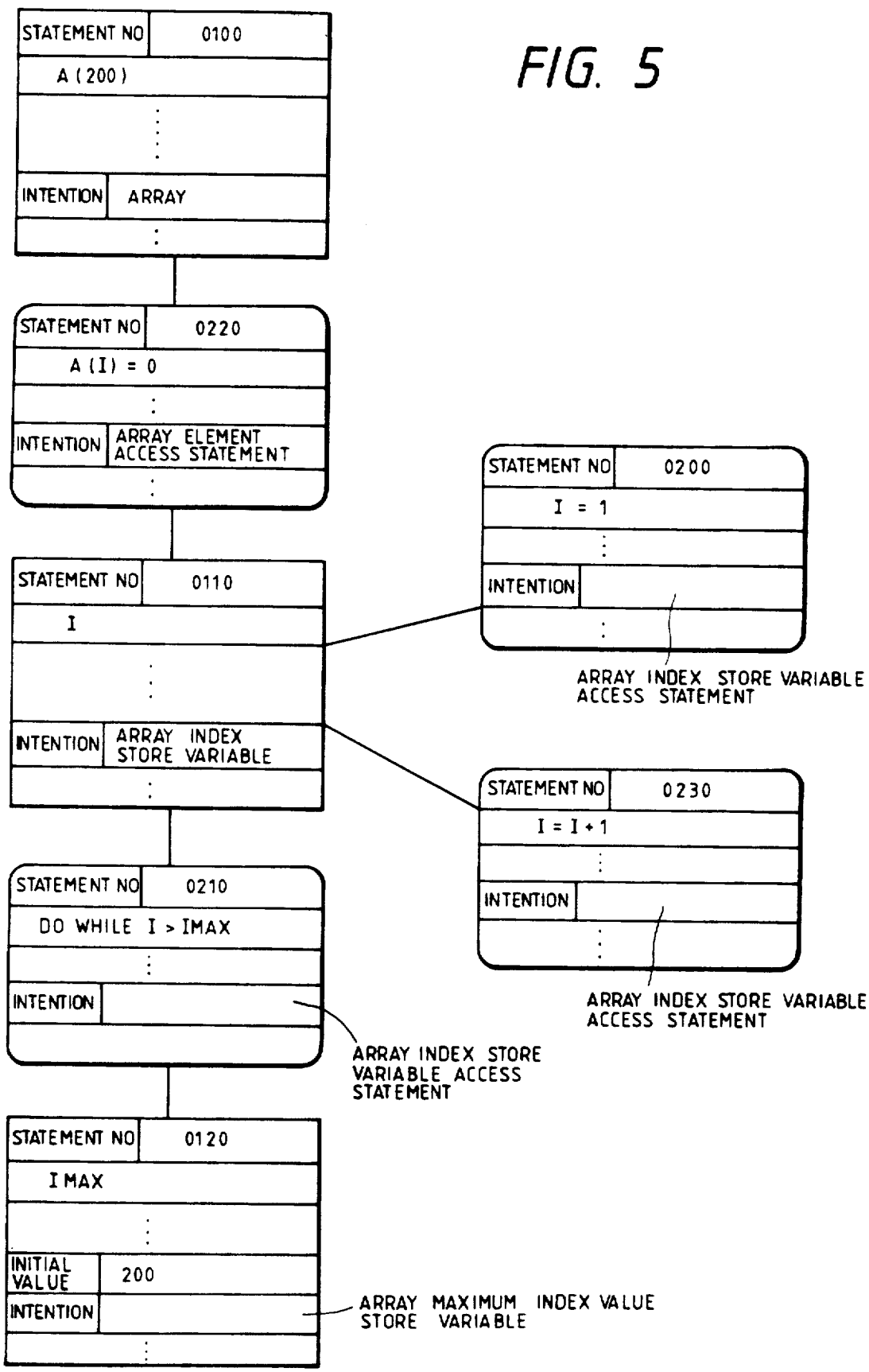
FIG. 5 shows an example of an understood program intention information of the program shown in FIG. 2.

A program intention understanding part (functional module) 7 functions to interpret the intention of the respective statements in the analyzed program information stored in the storage part 3 using the program intention understanding rules information stored in the store part 6, and to input the thus-obtained information on the program intentions which have been understood in an understood program intentions information storage part 8. FIG. 5 shows an example of understood program intention information obtained by interpreting the analyzed program information shown in FIG. 3 using the program intention understanding rules shown in FIG. 4. As will be seen from FIG. 5, the understood program intention information pertaining to is composed of information the attributes of the statements and information which represents the relationship between the statements as in the case of the analyzed program information of FIG. 3 except that the former has program intention information appended thereto which is obtained by the use of the program intention understanding rules shown in FIG. 4, such as array index store variables and array index variable access statements.

Figure 6:
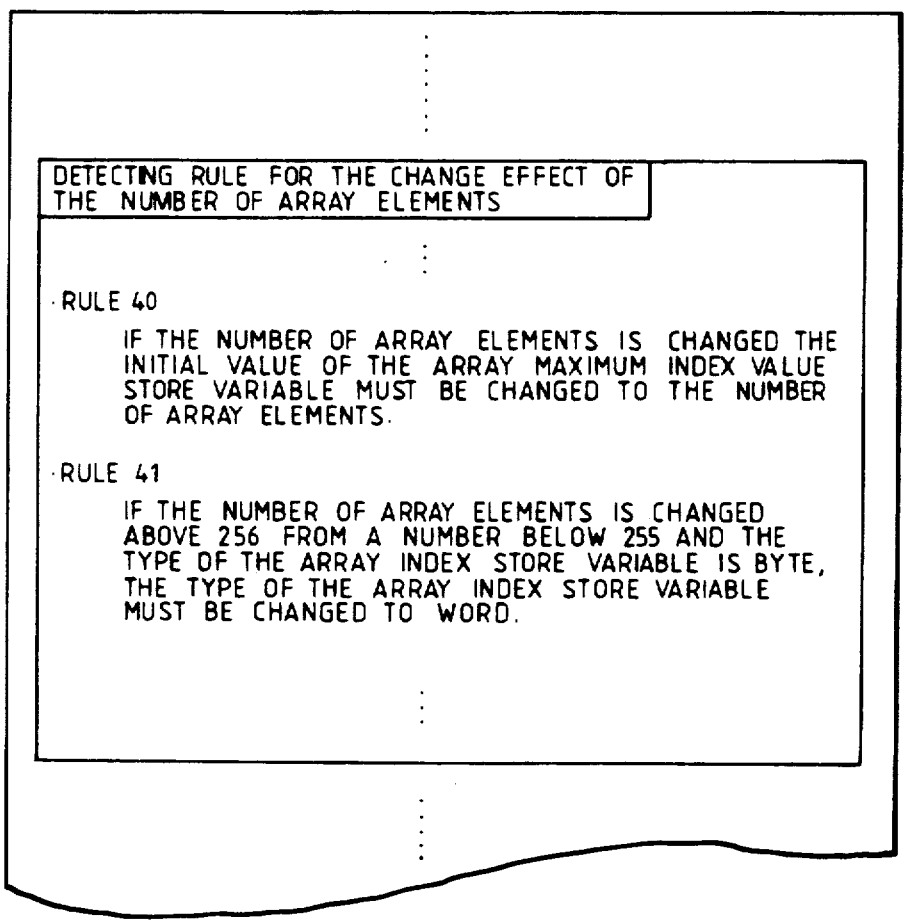
FIG. 6 shows an example of program change detail detecting rules.

A card inputting unit 9 is adapted to input program change effect detecting rules used to detect the effect of a change in the program. FIG. 6 shows an example of these program change effect detecting rules. These rules are a set of rules used to determine which items should be changed and what kind of change will occur as a result of the particular change that has occurred in one item which has a particular intention. The program change effect detecting rules input by the card inputting unit 9 are analyzed by a program change effect detecting rules information input part (functional module) 10, and the analyzed program change effect detecting rules information is stored in a program change effect detecting rules information storage part 11.

The statements to be changed and the contents of those changes are input by a user through a keyboard 12. For example, in the source program example shown in FIG. 2, a change in the number of elements for an array A which is declared by a data declaration statement to which is appended a statement number 0100 from 200 to 300 may be input through the keyboard 12. The statements to be changed and the contents of those changes which are input through the keyboard 12 are analyzed by a program change information input part (functional module) 13.

A program change effect detecting part (functional module) 14 is adapted to analyze the understood program intention information in the understood program intention information storage part 8 on the basis of the statements to be changed and the contents of those changes designated by the input part 13 using the program change effect detecting rules information stored in the program change effect detecting rules information storage part 11, thereby allowing detection of the statements to be changed and the contents of those changes which are related to the designated changes. This detection processing comprises the steps of searching for the statement data corresponding to the designated statement to be changed in the understood program intention information stored in the storage part 8 so as to detect the related statement data by following the relationships between the statement data in the understood program intention information, determining whether or not the detected statement data is to be changed as well as the contents of the required changes when it has been determined that the detected statement data must be changed using the program change effect detecting rules information stored in the storage part 11, and repeating the above-described steps for all the designated statements.

A program change effect display part (functional module) 15 has the function of displaying on a display 16 a list of the statements affected by a change which are detected by the detecting part 14 (statements to be changed derivatively) and the contents of the requisite changes. FIG. 7 shows an example of such a list of detected statements affected by change and the contents of the requisite changes which is displayed when the number of elements for the array A in the data declaration statement having a number 0100 is changed to 300.

This list indicates that the changes shown in the right column are necessary in the statements having the numbers 0110 and 0120.

The processings performed by the program change effect detecting system of this embodiment will be carried out in the manner described below.

Prior to the processing, the program intention understanding rules are input by the card inputting unit 4, and the program intention understanding rules information is stored in the storage part 6, whereas the program change effect detecting rules are input by the cart inputting unit 9, and the program change effect detecting rules information is stored in the storage part 11.

When the program change effect detecting system is started by the user in order to change the program, the program analysis part 2 analyzes the object program stored in the source program storage part 1, and outputs the result of analysis to the storage part 3. Subsequently, the program intention understanding part 7 generates the understood program intentions information of the object program utilizing the program intention understanding rules information stored in the store part 6, and outputs the result to the storage part 8.

The user inputs through the keyboard 12 the object statements to be changed in the program and the contents of the necessary changes. The program change effect detecting part 14 analyzes the understood program intention information stored in the storage part 8 on the basis of the input program change information using the program change effect detecting rules information in the storage part 11, and displays the relevant statements affected by the change so detected and the contents of the requisite changes on the display 16 through the display part 15. Since the statements to be changed and the contents of requisite changes can be designated any number of times using the keyboard 12, it is possible to detect the changes which need to be effected as a consequence of a plurality of changes as well as secondary changes made necessary by the first change.

Further, if necessary, the program intention understanding rules and the program change effect detecting rules can be additionally input by the card inputting units 4 and 9 so as to increase or correct the program intention understanding rules information in the storage part 6 and the program change effect detecting rules information stored in the storage part 11, and the accuracy with which the statements affected by a change and the contents of requisite contents are detected can thus be improved.

Figure 8:
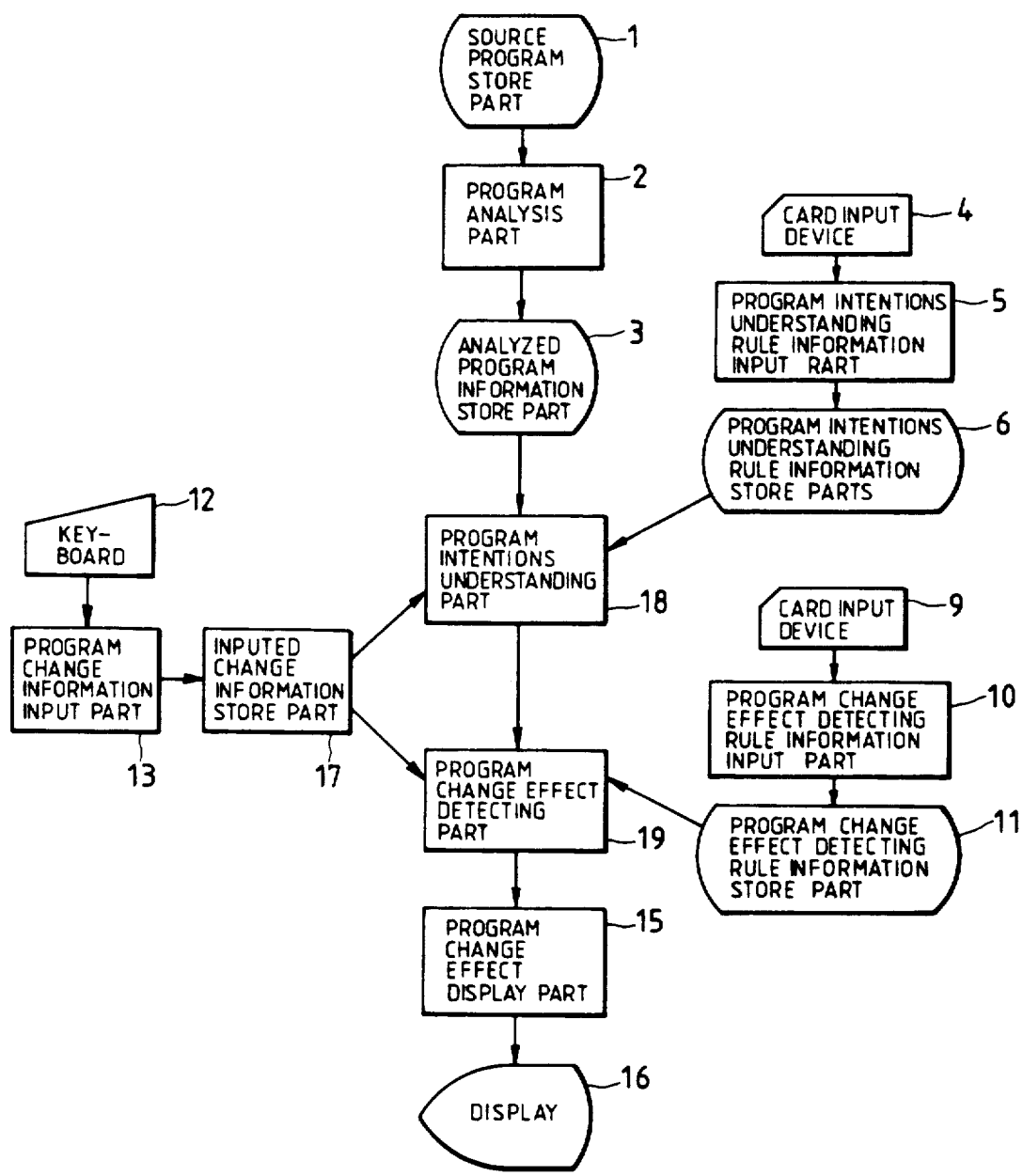
FIG. 8 is a block diagram of a second embodiment of the present invention, showing the functional structure thereof.

In the above-described embodiment, after the intentions of all the statements in the object program have been analyzed and the result of analysis has been stored in the understood program intention information storage part, the changes that must occur in association with the change designated by the user are detected by utilizing the stored information. This method is therefore effective when a large number of object statements need to be designated in one program. However, since understanding of the intention is conducted over the entire program, it is ineffective if only small number of changes take place in one program. FIG. 8 shows an embodiment which suits such a situation.

Figure 1:
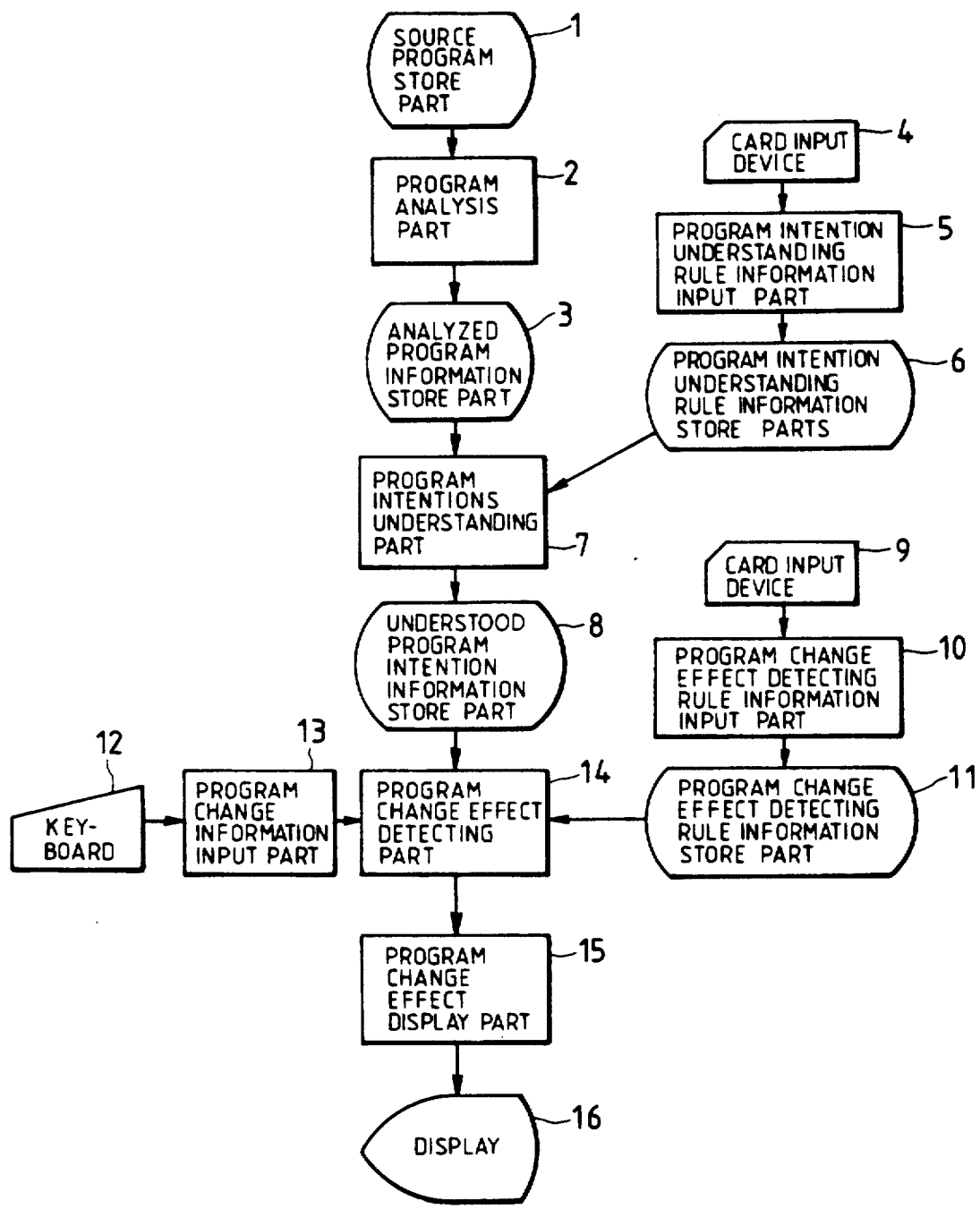
FIG. 1 is a block diagram of a first embodiment of the present invention, showing the functional structure thereof.

In FIG. 8, parts denoted by reference numerals 1 to 6, 9 to 13, 15, and 16 are identical to those designated by the same reference numerals in FIG. 1. When an object statement to be changed and the contents of the changes are input from the keyboard 12, change information representing the input data is stored in an input change information storage part 17. A program intention understanding part (functional module) 18 is adapted to extract only the statement information which is related to the object statement to be changed from the analyzed program, information stored in the storage part 3, and to analyze it using the program intention understanding rule information in the storage part 6 so as to affix the intention information to the extracted statement information. A program change effect detecting part 19 has the function of analyzing the intention information of the statements related to the object statement to be changed which are obtained from the program intention understanding part 18 using the program change effect detecting rules information stored in the storage part 11 so as to examine whether or not each of the related statements is affected by the change, and, if there are any statements affected by the change, display them, together with the contents of the changes which are indicated by the rule, on the display 16 through the display part 15.

The present embodiment involves understanding of the intentions of only the statements in a program which are related to the object statement to be changed, and is therefore effective in detecting the change effect when there are only a small number of object statements to be changed in one program.

In the above-described two embodiments, the program intention understanding rules and the program change effect detecting rules are stored in writable memories so that they can be freely increased and corrected, thereby enabling knowledge needed for the programming to be accumulated so as to gradually improve the change effect detecting ability. However, this requires that the program intention understanding part 18 and the change effect detecting part 19 read the respective rules information from the respective store parts, and does not therefore represent the best indicating method or system in terms of processing efficiency.

Figure 9:
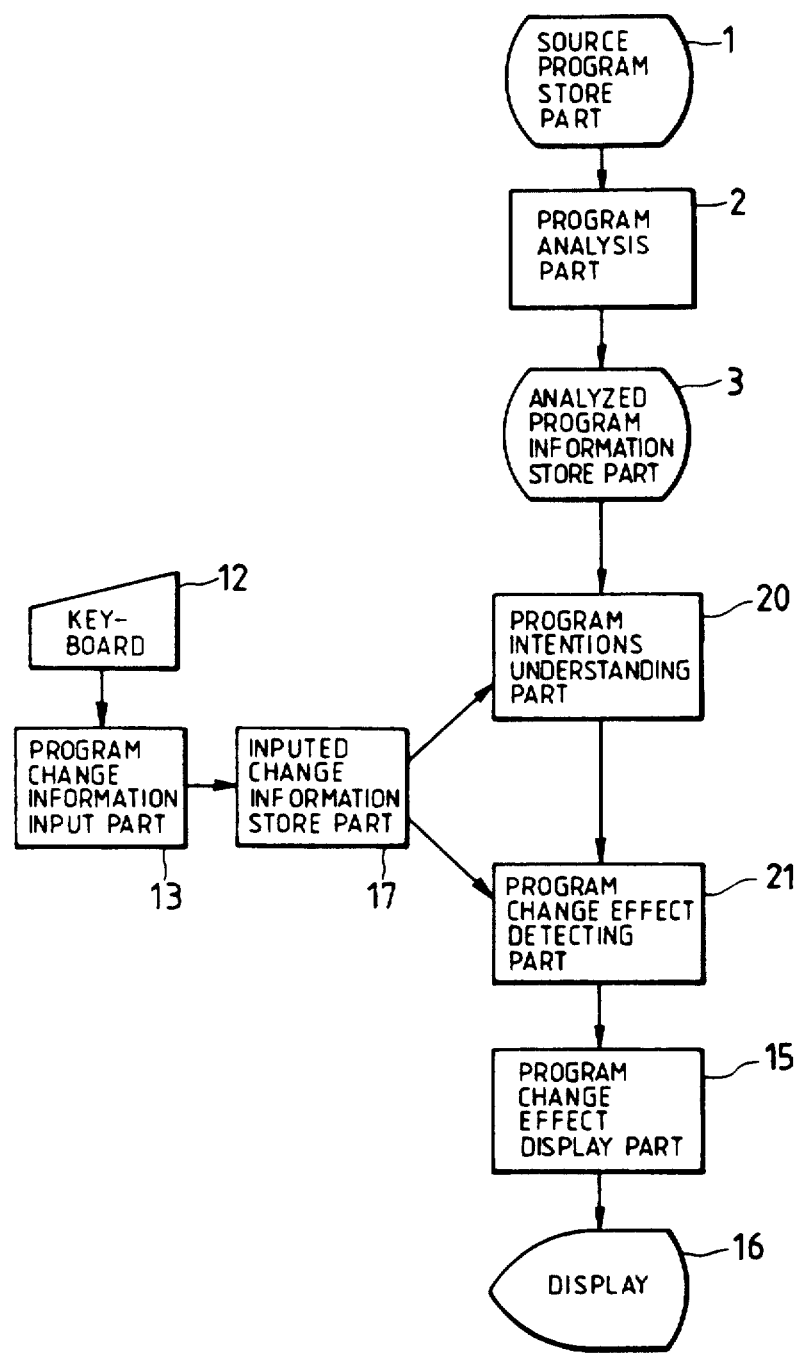
FIG. 9 is a block diagram of a third embodiment of the present invention, showing the functional structure thereof.

If the program intention understanding knowledge required for the detection of the change effect and the change effect detecting knowledge are clear, the indicating method or system may be made more effective if the program intention understanding part 18 and the program change effect detecting part 19 incorporate the respective rules information as built-in internal logic. FIG. 9 shows such an embodiment.

The third embodiment shown in FIG. 9 differs from the second embodiment shown in FIG. 8 in that the former does not include the rules information input and store parts 4 to 6 and 9 to 11. In the third embodiment, the program intention understanding rules information is incorporated in a program intention understanding part (function module) 20 as the internal logic, whereas the program change effect detecting rules information is incorporated in a program change effect detecting part (functional module) 21 as the internal logic.

In this embodiment, it is not necessary to register the program intention understanding rules and the program change effect detecting rules. The program analysis part 2 analyzes the source program stored in the storage part 1, and stores the analyzed information in the storage part 3. When the statement to be changed in the relating program and the contents of the changes are designated from the keyboard 12 by the user, the program change information input part 13 stores this information in the storage part 17. The program intention understanding part 20 analyzes the intentions of the related statements in the storage part 3 by the built-in intention understanding logic on the basis of the information in the storage part 17. The program change effect detecting part 21 analyzes the information representing the intentions of the related statements obtained by the intention understanding part 20 so as to determine whether or not the related statements are affected by the change as well as the contents of the changes by the built-in change effect detecting logic, and displays the results on the display 16 through the display part 15.

In this embodiment, the program intention understanding rules and the program change effect detecting rules are incorporated as internal logic, and details are therefore detected at a very high speed.

The aforementioned three embodiments will present no problem if the program intention understanding rules and the program change effect detecting rules are complete. However, it is often very difficult to prepare complete rules. Besides, in general the certainty of the individual rules can differ, thus making the certainty of the statements affected by the change and the contents of the changes which are listed by the system (for example, those shown in FIG. 7) different. In other words, accurate information and inaccurate information are mixed with each other in the list, and it is impossible for the user to distinguish them, This diminishes the usefullness of the change effect information and reduces the efficiency of the program change operation. These problems may be solved by the provision of an embodiment to be described below with reference to FIG. 10.

The fourth embodiment is the same as the first embodiment shown in FIG. 1, except that in the fourth embodiment the program intention understanding rules information input part 5, the program intention understanding rules information storage part 6, the program intention understanding part 7, the understood program intention information storage part 8, and the program change effect detecting part 14 in the first embodiment are respectively altered to a program intention inference rules information input part 22, a program intention inference rules information storage part 23, a program intent inference part 24, a program intent inference information storage part 25, and a program change effect inference part 26. These alterations are made in response to the fact that the program intention understanding rules of the type shown in FIG. 4 have been changed to program intention inference rules of the type shown in FIG. 13. The program intention inference rules are different from the program intention understanding rules in that the each item in the later rules has data that represents its certainty.

Figure 12:
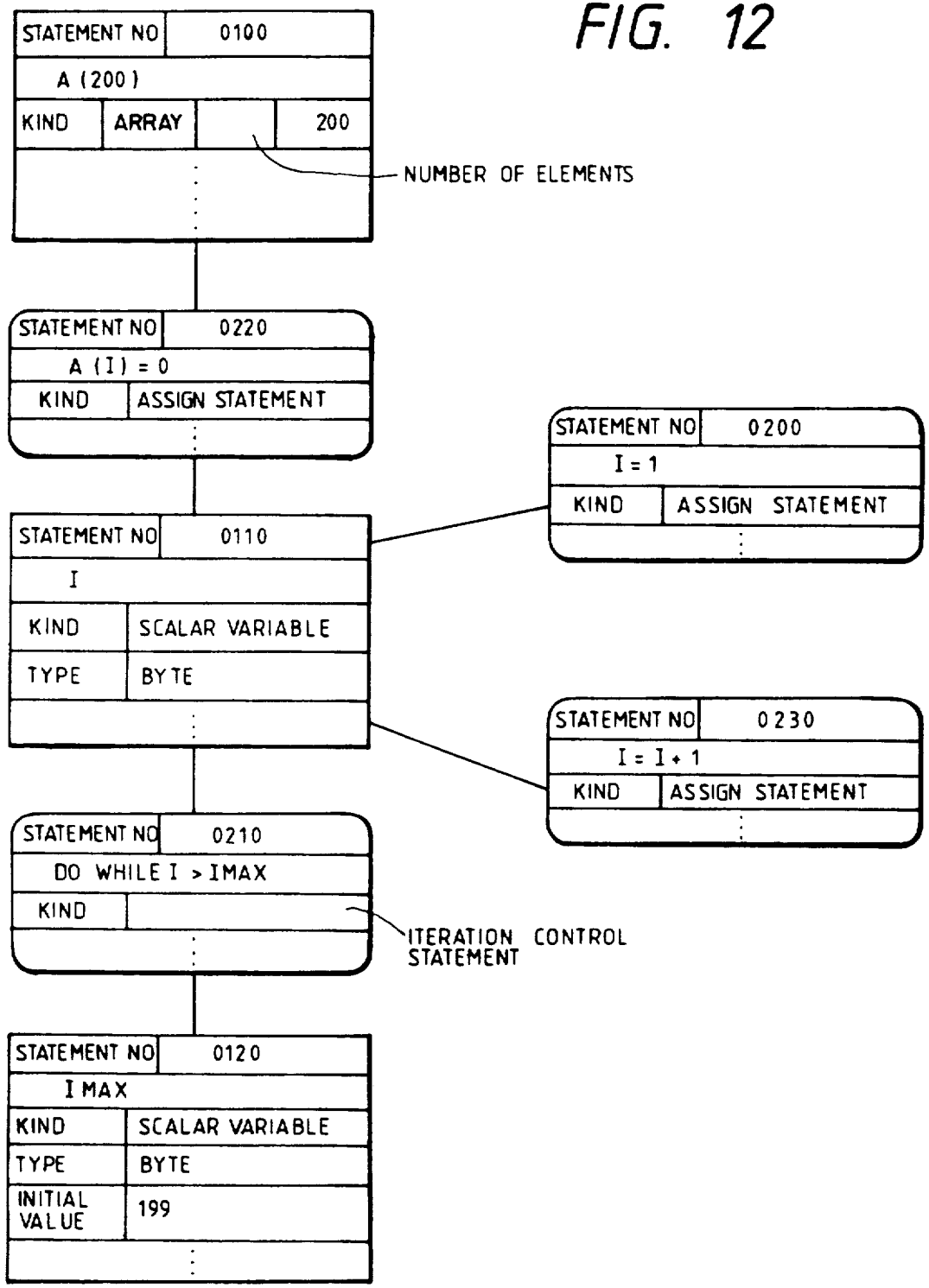
FIG. 12 shows an example of analyzed program information of the program of FIG. 11.

FIG. 11 shows an example of an object program to be changed which is stored in the source program storage part 1, and FIG. 12 shows an example of the analyzed program information which is obtained by the program analysis part 2 as the result of analysis of the program shown in FIG. 11 and which is stored in the analyzed program information storage part 3.

Figure 14:
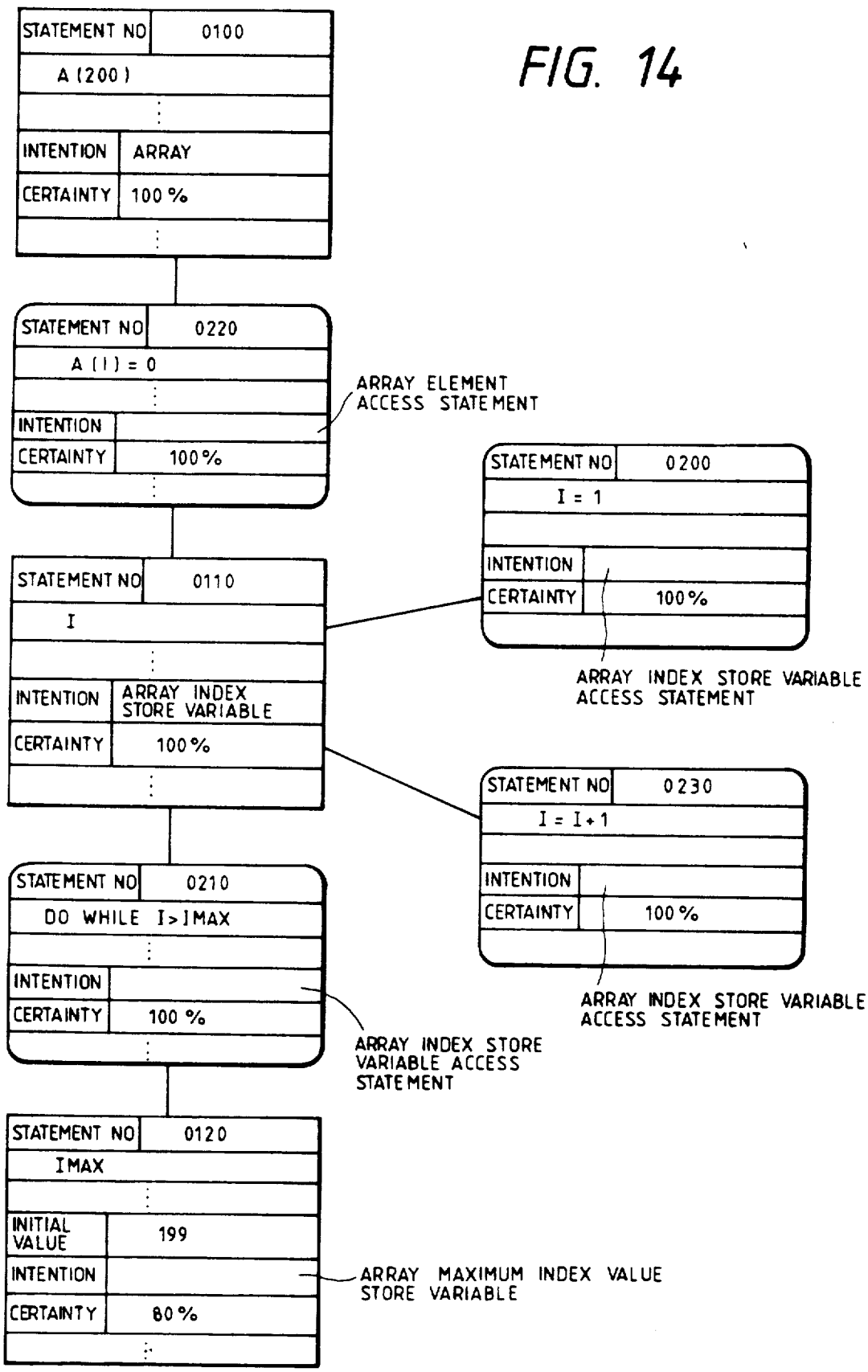
FIG. 14 shows an example of program intention inference information of the program of FIG. 11.

The program intent inference part 24, like the program intention understanding part 7 (FIG. 1) interprets the intentions of the respective statements in the analyzed program information in the storage part 3 using the program intention inference rules information in the storage part 23, and inputs thus-generated program intent inference information in the storage part 25. The program intent inference part 24 differs from the program intention understanding part 7 in that is affixes a certainty factor to the intention information of the respective statements. FIG. 14 shows an example of the program intent inference information generated by interpreting the analyzed program information shown in FIG. 12 by the program intention inference rules shown in FIG. 13. This program intent inference information is basically the same as the understood program intention information shown in FIG. 5 except that the intention information of the respective statements shown in FIG. 14 has a certainty factor affixed to it. For example, data IMAX in the data declaration statement having a statement number 0120 is inferred as an array maximum index value store variable in accordance with the rule 23 in FIG. 13, and the certainty of the inference reflects that of the rule 23 employed and is set to 80%. Also, data I in the data declaration statement having a statement number 0110 is inferred as an array index store variable with a certainty of 100%.

Figure 15:
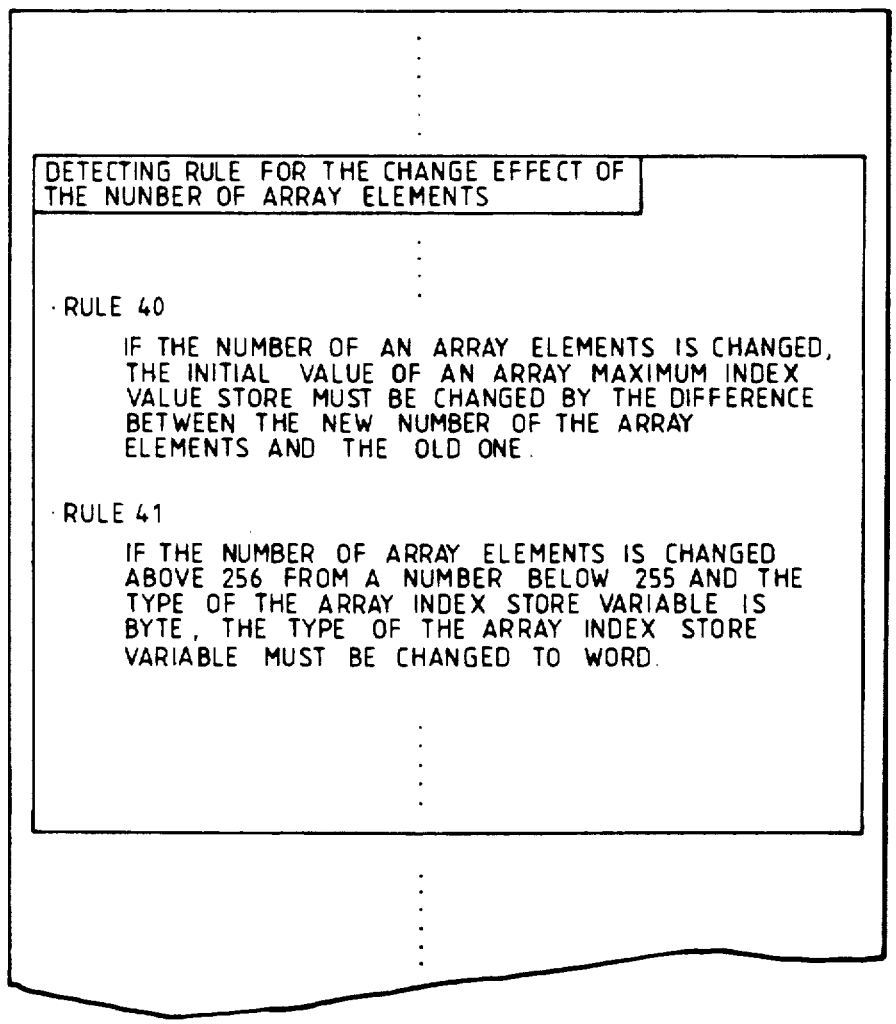
FIG. 15 shows another example of the program change detail detecting rules.

The program change effect inference part 26, like the program change effect detecting part 14 shown in FIG. 1, functions to infer the statements to be changed in connection with the object statement to be changed and the contents of the changes which are designated by the user from the keyboard 12, as well as the contents of the changes. It differs from the program change effect detecting part 14 in that the former affixes to the result of inference a certainty factor which corresponds to that affixed to the intention information on which inference is based. FIG. 15 shows an example of the program change effect detecting rules input by the card inputting unit 9 which are basically the same as those shown in FIG. 6. FIG. 16 shows an example of a list of the statements affected by the change and the contents of the changes which is displayed on the display 16 when the number of element of an array A in the data declaration statement having a statement number 0100 is changed from 200 to 300. As has been described with reference to FIG. 14, since the data I in the data declaration statement having a statement number of 0110 is an array index store variable with a certainty of 100% while the data IMAX in the data declaration statement having a statement number 0120 is an array maximum index value store variable with a certainty of 80%, the corresponding change effect information in FIG. 16 is also affixed with the same certainty factors.

The certainty factors of the program intention inference rules can also be corrected by the card inputting unit 4.

Figure 10:
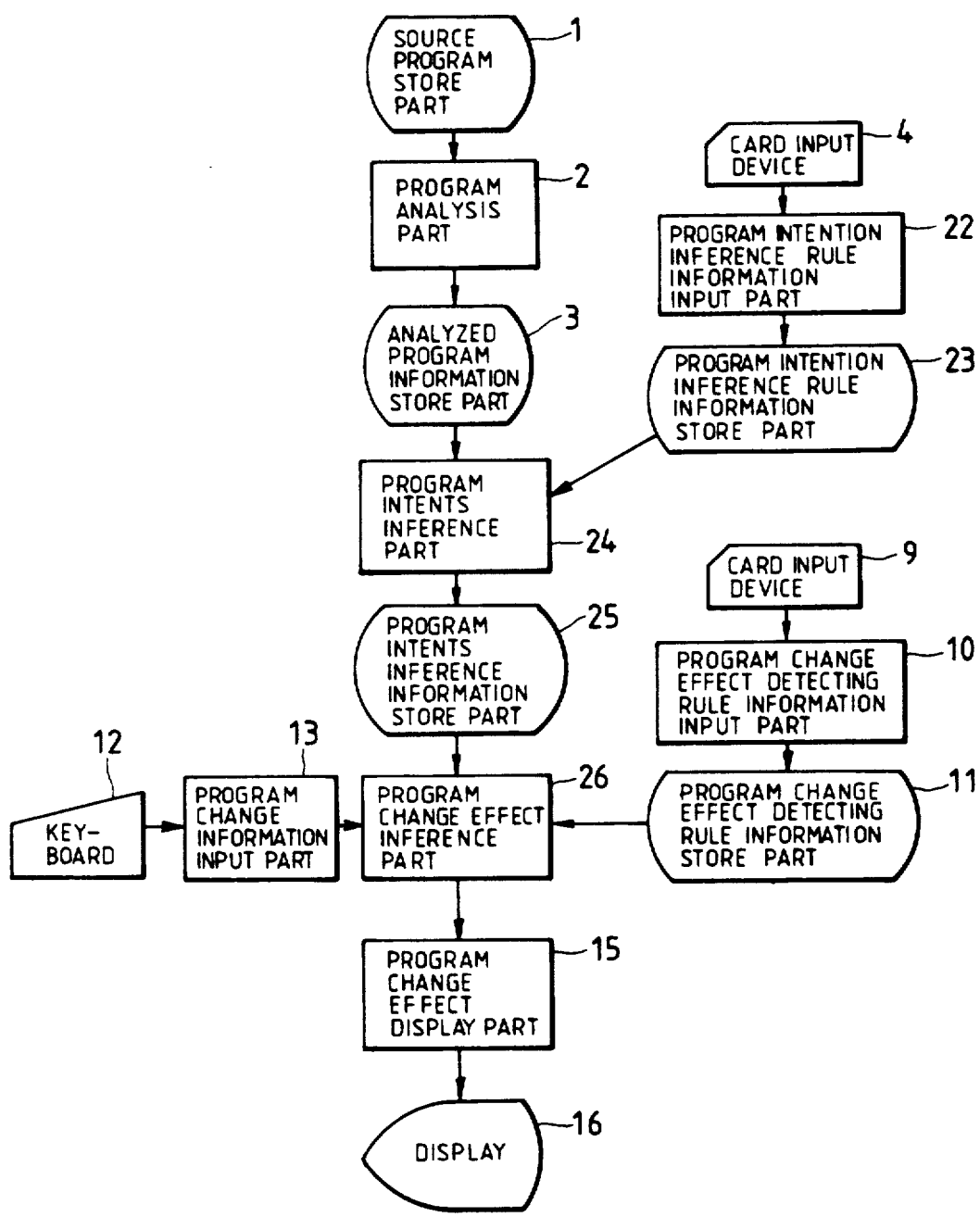
FIG. 10 is a block diagram of a fourth embodiment of the present invention, showing the functional structure thereof.
Figure 17:
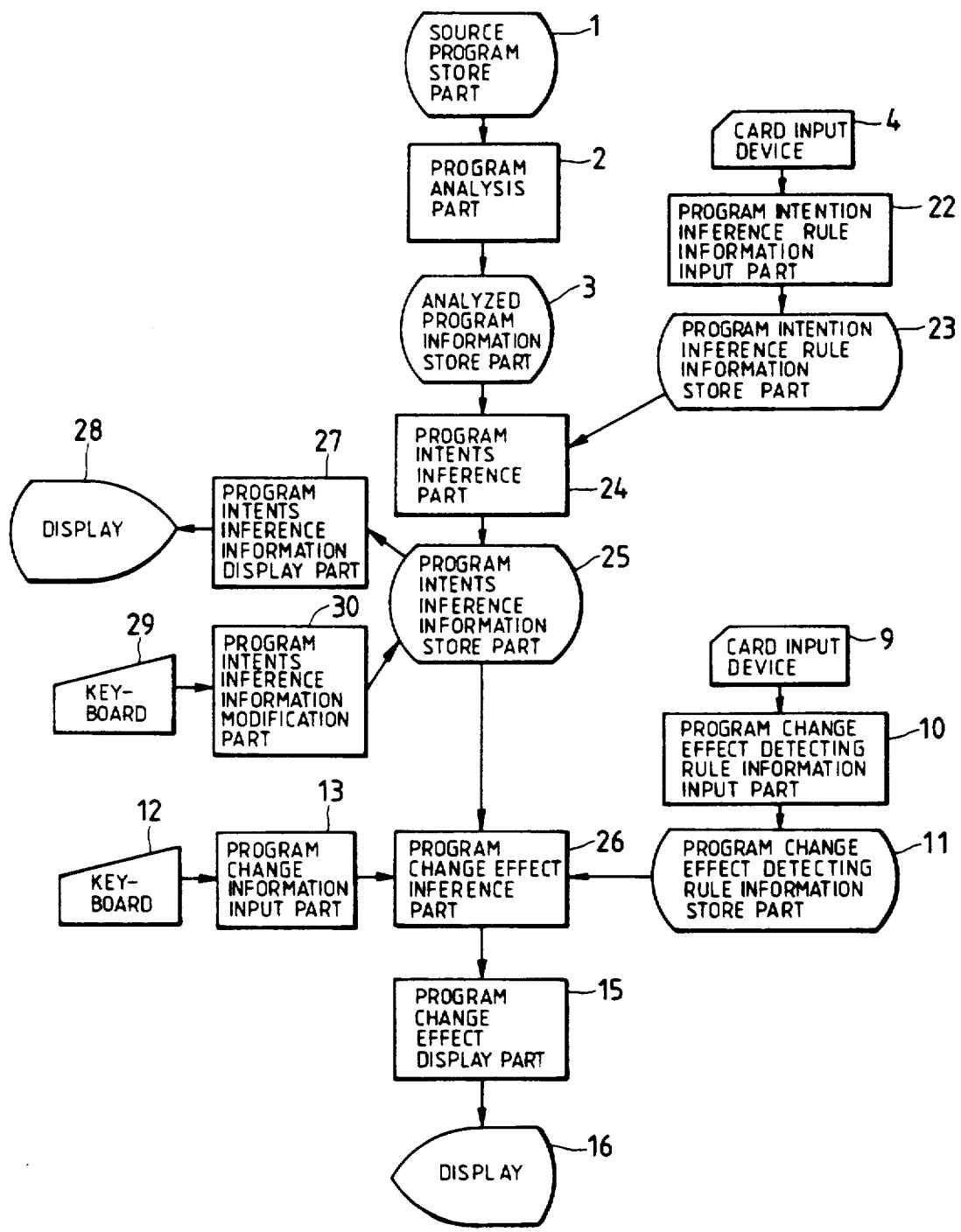
FIG. 17 is a block diagram of a fifth embodiment of the present invention, showing the functional structure thereof.

FIG. 17 shows a fifth embodiment of the present invention which is the same as the fourth embodiment shown in FIG. 10 except that the former has a function of interactively modifying the program intention information inferred by the system. More specifically, this embodiment includes, in addition to the components of the fourth embodiment shown in FIG. 10, a program intents inference information display part (functional module) 27, a display 28, a keyboard 29, and a program intent inference information modification part (functional module) 30. The program intent inference information display part 27 has the function of editing the program intent inference information in the storage part 25 and displaying the result on the display 28. The program intent inference information modification part 30 has the function of modifying the program intent inference information in the storage part 25 using the program intents inference information modifying information input from the keyboard 29.

Assuming that the program intent inference information shown in FIG. 14 is contained in the storage part 25, this information is displayed by the program intent inference information display part 27 on the display 28. It is also assumed that the certainty with which the intention of the data IMAX in the data declaration statement having a statement number 0120 is an array maximum index value store variable should be changed from 80% to 100%. When this instruction is input from the keyboard 29, the program intent inference information modification part 30 changes information representing the certainty factor of the intention of the relevant statement in the program intents inference information in the storage part 25 from 80% to 100%. The program change effect inference part 26 then infers the statements affected by the change and the contents of the requisite changes in the same manner as in the case of the program change effect inference part 26 in the embodiment shown in FIG. 10, using the program intent inference information in the storage part 25, the object statement to be changed and the contents of the requisite changes which are input through the keyboard 12, and the program change effect detecting rules information in the storage part 11, and displays the result on the display 16 through the program change effect display part 15. FIG. 18 shows an example of change effect information which is the same as that shown in FIG. 16 except that the certainty has been accordingly modified. As can be seen from the figures, the certainty factor of the change effect information for the statement 0120 has been changed from 80% to 100%. This means that the certainty of the intention of the statement 0120 has been modified from 80% to 100%.

Thus, in the present embodiment, the intention information of the object program to be changed is interactively modified so as to improve the certainty of the present change effect information. The intention of the statement in the program may also be modified in the same way.

Figure 19:
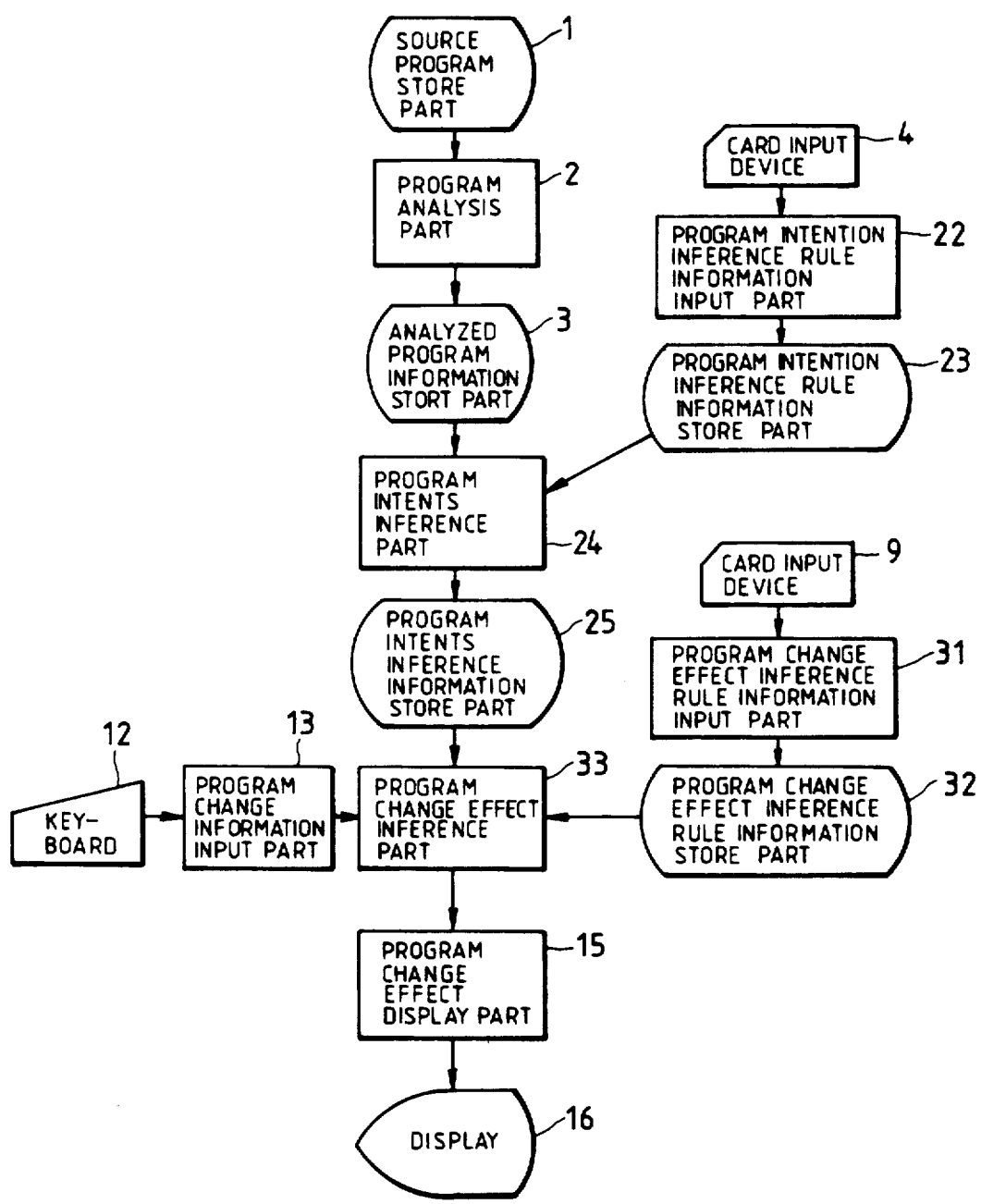
FIG. 19 is a block diagram of a sixth embodiment of the present invention, showing the functional structure thereof.

FIG. 19 shows an embodiment in which the program change effect detecting rules also have certainty information affixed thereto. The structure of the embodiment shown in FIG. 19 is basically the same as that of the embodiment shown in FIG. 10 except that the former includes a program change effect inference rules information input part 31 and a program change effect inference rules information storage part 32 in place of the program change effect detecting rules information input part 10 and the program change effect detecting rules information storage part 11 which are incorporated in the latter embodiment. The program change effect inference part 26 in the latter embodiment is also replaced by a program change effect inference part 33 which is partially different from the program change effect inference part 26 in terms of function. These alterations are made in response to the fact that the respective items of the program change effect detecting rules are affixed with a certainty factor. As a result, the program change effect detecting rules are changed to program change effect inference rules shown in FIG. 20.

The program change effect inference part 33 determines the statements that need to be changed derivatively and the contents of the requisite changes in response to the designation of the object statement to be changed and the contents of the requisite changes which is made from the keyboard 12 by adopting the program change effect inference rules information having the certainty factor which is stored in the storage part 32 (FIG. 20) to the program change effect inference information having the certainty factor which is stored in the storage part 25 (FIG. 14). The program change effect inference part 33 also calculates the certainty with which the determination is made from the certainty factors affixed to the two information, and displays the result of determination and calculation as a list of statements affected by change on the display 16 through the program change effect display part 15.

FIG. 21 shows an example of a list of statements affected by change which is obtained under the same condition as that with which the list shown in FIG. 16 is provided except that the change effect inference rules shown in FIG. 20 are employed in place of the change effect detecting rules shown in FIG. 15. For example, since the certainty with which data IMAX in the statement having a number 0120 is an array maximum index value store variable is 80% (rule 23 in FIG. 13) while the certainty with which the initial value of an array maximum index value store variable needs to be changed is 80% (rule 40 in FIG. 20), a certainty with which the initial value in the statement having a number 0120 needs to be changed is a product of these certainty factors, i.e., 64%. The certainty of the other items can be calculated in the same manner.

Thus, in this embodiment, not only the program intents inference information rules but also the program change effect inference rules are affixed with a certainty factor, and a certainty of the change effect information is inferred from these certainty factors and displayed. In consequence, the reliability with which the change effect information is presented to the user can be further increased.

Figure 22:
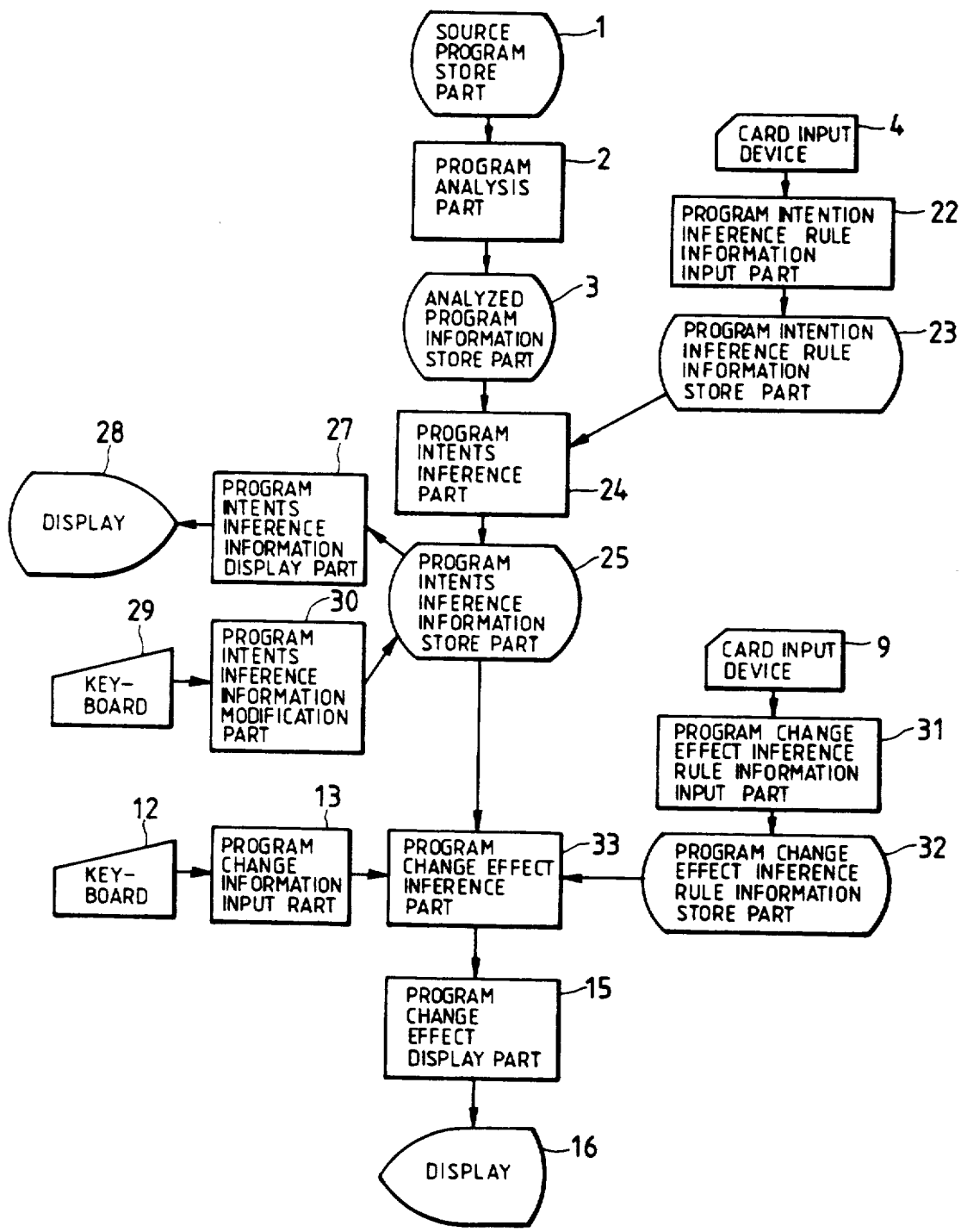
FIG. 22 is a block diagram of a seventh embodiment, showing the functional structure thereof.

A function of interactively modifying program intent inference information (designated by reference numerals 27 to 30 in FIG. 17) may be added to the functional structure shown in FIG. 19, and this forms seventh embodiment which is shown in FIG. 22.

Further, the program intention inference rules information and the program change effect inference rules information may not be stored in a writable memory but be incorporated in the program intention inference part and the program change effect inference part, respectively, as internal logic, as in the case of the embodiment shown in FIG. 9. Although this modification has disadvantages in that it is difficult to increase and modify these rules and in that it therefore lacks flexibility, a high speed processing can be expected.

Figure 23:
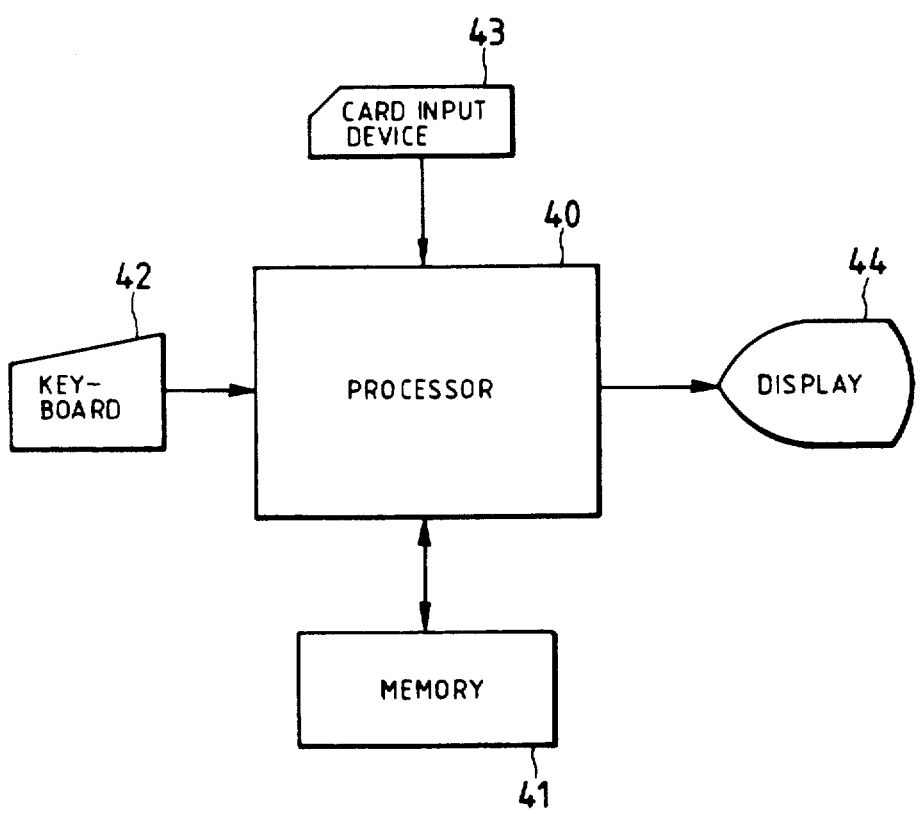
FIG. 23 is a view of a hardware structure designed to carry out various types of function of the present invention.

FIG. 23 shows a hardware structure which is designed to carry out the functions of the embodiments described with reference to FIGS. 1, 8, 9, 10, 17, 19 and 22. This computer system comprises a single processor 40, a memory 41, a keyboard 42, a card inputting device 43, and a display 44. The processor 40 carries out the functions of the components 2, 5, 7, 10, 13, 14, 15, 18, 19, 20, 21, 22, 24, 26, 27, 30, 31, and 33. The storage parts 1, 3, 6, 8, 11, 23, 25, 32, and 33 may be incorporated in the memory 41. The keyboard 42 in FIG. 23 corresponds to the keyboard 12. The card inputting device 43 corresponds to the card inputting units 4 and 9, while the display 44 corresponds to the display 16.

A composite computer system which incorporates a plurality of processors may also be employed. In this case, the functions of the components are divided into several sections, and the sections are allocated to the respective processors.

As will be understood from the foregoing description, in the present invention, the parts to be changed in the program, as well as the contents of the required changes, can be presented in a concrete fashion to a user. Further, a certainty factor is presented together with this information, whereby the practical value of the presented change effect information is greatly increased. In consequence, the efficiency of program change work can be improved, thus making it possible for high reliability to be obtained with less labor.

What is claimed is:

1. A method of indicating parts of program affected by a change in a part of the program through use of a system incorporating a processing means, an inputting means, and an outputting means, said method comprising the steps of:

preparing, by said processing means, program intention information representing intentions of respective parts of the program and information representing a connection between parts of the program;

inputting from said inputting means to said processing means change designating information which represents a first part of the program to be subjected to a change and contents of the change to which the first part of the program is to be subjected;

generating by said processing means change effect information which identifies parts of the program other than the first part to be subjected to changes in accordance with the change to which the first part of the program is to be subjected and contents of the changes to which the other parts of the program are to be subjected, said change effect information being generated in accordance with predetermined change effect determining rules from the program intention information representing the intentions of the respective parts of the program, the information representing the connection between the parts of the program, and said change designating information; and outputting to said outputting means said change effect information generated by said processing means for inspection by a user;

wherein the program intention information has a certainty factor affixed to it, and the outputting step includes the step of generating change effect information to which a certainty factor determined from said certainty factor affixed to the program intention information is affixed.

2. A program change effect indicating method according to claim 1, wherein said preparing step includes the step of generating analyzed program information by analyzing the program, said analyzed program information representing attributes of respective statements which constitute the program and a connection between the statements, and the step of generating, in accordance with predetermined program intention determining rules, said program intention information which represents intentions of the respective statements in the program from said analyzed program information.

3. A method according to claim 1, wherein the outputting step includes the step of displaying said change effect information on a display device.

4. A program change effect indicating method for use in a computer system designated to provide a determination of parts of a program to be subjected to changes and contents of the changes, said method comprising the steps of:

generating analyzed program information by analyzing the program, said analyzed program information representing attributes of respective statements which constitute the program and the connection between said statements;

generating, in accordance with predetermined program intention determining rules, program intention information representing intentions of said respective statements in the program from said analyzed program information;

inputting change designating information designated by a user which represents a particular statement to be subjected to a change and contents of the change to which the particular statement is to be subjected;

generating, in accordance with predetermined change effect determining rules, change effect information which identifies other statements to be subjected to changes in accordance with the change to which the particular statement is to be subjected and contents of the changes to which the other statements are to be subjected from said program intention information, information representing the relationship between the statements, and said change designating information; and outputting said change effect information for inspection by a user;

wherein a certainty factor is affixed to said program intention determining rules, said program intention information generating step generates program intention information to which a certainty factor determined from the certainty factor affixed to said program intention determining rules is affixed and said change effect information generating step generates change effect information to which a certainty factor determined from said certainty factor affixed to said program intention information is affixed.

5. A program change effect indicating method according to claim 4, wherein a certainty factor is also affixed to said change effect determining rules, and said change effect information generating step determines the certainty factor affixed to said change effect information from the certainty factor affixed to said program intention information and the certainty factor affixed to said change effect determining rules.

6. A program change effect indicating method according to claim 4, wherein said program intention information generating step includes the step of modifying program intention information generated through conversations with a user.

7. A program change effect determining method according to claim 4, said method further comprising the steps of:

storing in a memory information which represents said program intention determining rules and information which represents said change effect determining rules; and modifying rules stored in accordance with a request from the user.

8. A method according to claim 4, wherein the outputting step includes the step of displaying said change effect information on a display device.

* * * * *